(12) United States Patent
Shen

(10) Patent No.: US 10,376,044 B2
(45) Date of Patent: Aug. 13, 2019

(54) INTERACTIVE LEARNING DESK WITH DOCUMENT CAMERA

(71) Applicant: PATHWAY INNOVATIONS AND TECHNOLOGIES, INC., San Diego, CA (US)

(72) Inventor: Ji Shen, San Diego, CA (US)

(73) Assignee: Pathway Innovationa and Technologies, Inc., San Diego, CA (US)

( * ) Notice: Subject to any disclaimer, the term of this patent is extended or adjusted under 35 U.S.C. 154(b) by 0 days.

(21) Appl. No.: 15/410,580

(22) Filed: Jan. 19, 2017

(65) Prior Publication Data

US 2017/0295926 A1 Oct. 19, 2017

Related U.S. Application Data

(60) Provisional application No. 62/280,648, filed on Jan. 19, 2016.

(51) Int. Cl.
| | |
|---|---|
| *A47B 41/06* | (2006.01) |
| *H04N 1/00* | (2006.01) |
| *G06F 1/16* | (2006.01) |
| *G09B 5/02* | (2006.01) |
| *A47B 17/00* | (2006.01) |

(Continued)

(52) U.S. Cl.
CPC .............. *A47B 41/06* (2013.01); *A47B 17/00* (2013.01); *A47B 21/04* (2013.01); *A47B 39/00* (2013.01); *A47B 39/12* (2013.01); *G06F 1/162* (2013.01); *G06F 1/1643* (2013.01); *G09B 5/02* (2013.01); *H04N 1/00522* (2013.01); *H04N 1/00559* (2013.01)

(58) Field of Classification Search
None
See application file for complete search history.

(56) References Cited

U.S. PATENT DOCUMENTS 6,493,469 B1 * 12/2002 Taylor ................. H04N 1/1903
348/E7.079
7,063,024 B2 * 6/2006 Latino ................ A47B 21/0073
108/147

(Continued)

FOREIGN PATENT DOCUMENTS

| CN | 102652600 A | * | 9/2012 |
| JP | 2003009956 A | * | 1/2003 |

*Primary Examiner* — Thomas D Lee
(74) *Attorney, Agent, or Firm* — Trevor Coddington; San Diego IP Law Group LLP

(57) ABSTRACT

The present invention provides a smart, electronic desk to facilitate and improve interactive learning. The desk comprises a student desk having a table, a computer such as a tablet having a touch-screen interface, and a document camera all integrated together. The interface displays electronic information to the student and provides a graphic user interface that allows the student to interact with programs or apps through graphical icons and visual indicators. The document camera, also known as a visual presenter, captures images and/or video of documents or other objects placed on the table. The computer comprises a bilateral communications interface to communicate information such as, but not limited to video, between the computer and optional document camera at the electronic desk, and any number of other computers.

16 Claims, 6 Drawing Sheets

(51) Int. Cl.
*A47B 21/04* (2006.01)
*A47B 39/00* (2006.01)
*A47B 39/12* (2006.01)

(56) References Cited

U.S. PATENT DOCUMENTS

| | | | |
|---|---|---|---|
| 2005/0168627 A1* | 8/2005 | Yi | H04N 5/2252 348/373 |
| 2006/0075934 A1* | 4/2006 | Ram | B60N 3/004 108/44 |
| 2010/0307382 A1* | 12/2010 | Mammana | A47B 21/007 108/5 |
| 2011/0075337 A1* | 3/2011 | Riley | A47B 21/0073 361/679.2 |
| 2012/0260830 A1* | 10/2012 | Luiten | A47B 21/0073 108/6 |

* cited by examiner

INTERACTIVE LEARNING DESK WITH DOCUMENT CAMERA

CROSS REFERENCE TO RELATED APPLICATION

This present invention claims priority to U.S. Provisional Patent Application No. 62/280,648, filed on Jan. 19, 2016, and entitled, "Interactive Learning Desk With Document Camera," the disclosure of which is incorporated by reference herein in its entirety.

BACKGROUND OF THE INVENTION

1. Field of Invention

The present invention relates to interactive education and more specifically, to a smart, electronic desk including a document camera.

2. Description of Related Art

Passive learning involves students listening to teachers lecture or memorization of information. At times, passive learning has its place as students need to memorize pertinent facts and figures. However, sitting at a desk copying figures from a chalkboard or whiteboard does not often play into the strengths of students.

Today's students are growing up in a technology-rich environment. Schools are turning to interactive learning to inspire students and bolster teacher-student relationships. In interactive learning, students participate in the lesson plan through technology, e.g., online reading or math software. Interactive learning sharpens critical thinking skills, which are fundamental to the development of analytic reasoning. A student who can explore an open-ended question with imagination and logic is learning how to make decisions, as opposed to just regurgitating memorized information. Also, interactive learning teaches students how to collaborate and work successfully in groups, an indispensable skill as workplaces become more team-based in structure.

SUMMARY OF THE INVENTION

The present invention provides a smart, electronic desk to facilitate and improve interactive learning. The desk comprises a student desk having a seat and table (i.e., writing surface), a computer such as a tablet having a touch-screen interface integrated into the writing surface, and a document camera integrated into the desk. The interface displays electronic information to the student and provides a graphic user interface that allows the student to interact with programs or apps through graphical icons and visual indicators. The touch-screen monitor may optionally include a video camera in addition to the document camera. The document camera, also known as a visual presenter, captures images and/or video of documents or other objects placed on the table. The computer comprises a bilateral communications interface to communicate information such as, but not limited to video, between the computer (and/or document camera) at the electronic desk and any number of other computers, e.g., other electronic desks, a teacher's computer, or a classroom monitor.

In an embodiment of the invention, a desk comprises: a writing surface; a touchscreen interface of a computer integrated into the writing surface; and a document camera, wherein the document camera is structurally configured to move between a lowered position to an upright position. The lowered position is below the writing surface. The upright position is above the writing surface and a camera of the document camera is downwardly facing the writing surface. The touchscreen interface is detachably coupled to the writing surface. The computer is a tablet. An edge of the tablet is configured to act as a pivot in order to move the tablet between a closed position and an open position. The tablet is flush with the writing surface in the closed position. The document camera comprises an adjustable arm with one or two pivot points. A clip is structurally configured to lock the document camera in the lowered position.

An advantage of the present invention is that it improves the interactive learning experience by better facilitating student involvement and the sharing of information. Another advantage is the integration of a tablet or computer with a desk, which eliminates the need for complicated logistics for managing free standing devices that are often susceptible to damage, accident, and theft. Another advantage is that the present invention eliminates the need for charging stations.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF EMBODIMENTS

Figure 1:
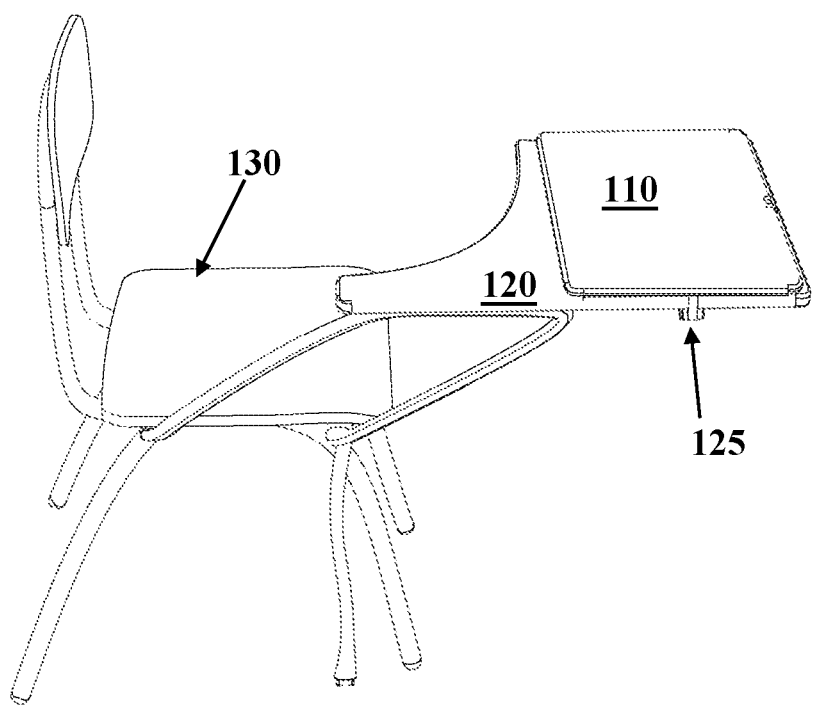
FIG. 1 illustrates a student desk according to an embodiment of the invention.

Further features and advantages of the invention, as well as the structure and operation of various embodiments of the invention, are described in detail below with reference to the accompanying FIGS. 1-6, wherein like reference numerals refer to like elements. Although the invention is described in the context of classroom furniture (e.g., a student desk), the present invention can be utilized as any type of furniture including, but not limited to office or home furniture.

FIG. 1 illustrates a classroom desk 100 according to an embodiment of the invention. The desk 100 comprises a computer 110, a table (i.e., writing surface) 120, a document camera 125 (shown in a lowered position underneath the table 120 and partially hidden from view), and a chair 130 integrated together as a single piece of furniture. The computer 110 is permanently secured to the table 120 via a mounting structure (not shown). Alternatively, the computer 110 can be detachably coupled to the table 120 so that the student may take the computer 110 away from the desk 100. In a preferred embodiment of the invention, the computer 110 is a tablet computer with a touchscreen interface with an operating system such as Apple iOS, Microsoft Windows, or Google Android, among others, the implementation of which are readily apparent to one of ordinary skill in the art. FIG. 1 shows the computer 110 in a closed position. In this position, the surface of the computer 110, e.g., touchscreen interface, is integrated into and may be flush with the table 120 to provide the student with a writing surface. For example, the top side of the computer 110 may have a protective covering to allow the student to place objects and writing materials on the computer 110 without damaging it.

The table 120 and chair 130 may take any form factor whether combined together as shown or as separate pieces of furniture. In a preferred embodiment of the invention, the table 120 and chair 130 are integrated into a single piece of classroom furniture; for example, a table arm desk as shown. Alternatively, the table 120 and chair 130 can be unconnected pieces of disparate furniture. For example, the table 120 can be a stand-up desk, open front desk, office desk, a multi-student desk or group learning desk (with multiple computers 110), a lift lid desk (where the computer 110 is in the lid), or other type of workstation. Any type of appropriate chair 130 can then be used with such a standalone table 120.

In an embodiment of the invention, the document camera 125 can magnify and project the video image of documents and three-dimensional objects placed on the writing surface 120. In an exemplary embodiment of the invention, the document camera 125 comprises optics, camera, an optional lighting system, and a motherboard with appropriate firmware. Simple or highly complex optical system can be used. The camera preferably a progressive scan camera, e.g., a charge-coupled device (CCD) sensor or complementary metal-oxide semiconductor (CMOS) sensor, to provide high-resolution color images at thirty (30) frames per second or more. A lighting system may be used to illuminate the writing surface. The motherboard may have a variety of connections to output video such as HDMI, DVI, VGA, USB, and/or LAN, the implementation of which are apparent to one of ordinary skill in the art. The document camera 125 may also be equipped with wireless technology such as, but not limited to WIFI to eliminate the need for cables. The term document camera as used herein means a device as noted above that can direct its camera toward the writing surface, preferably from vertically overhead the writing surface.

Figure 2:
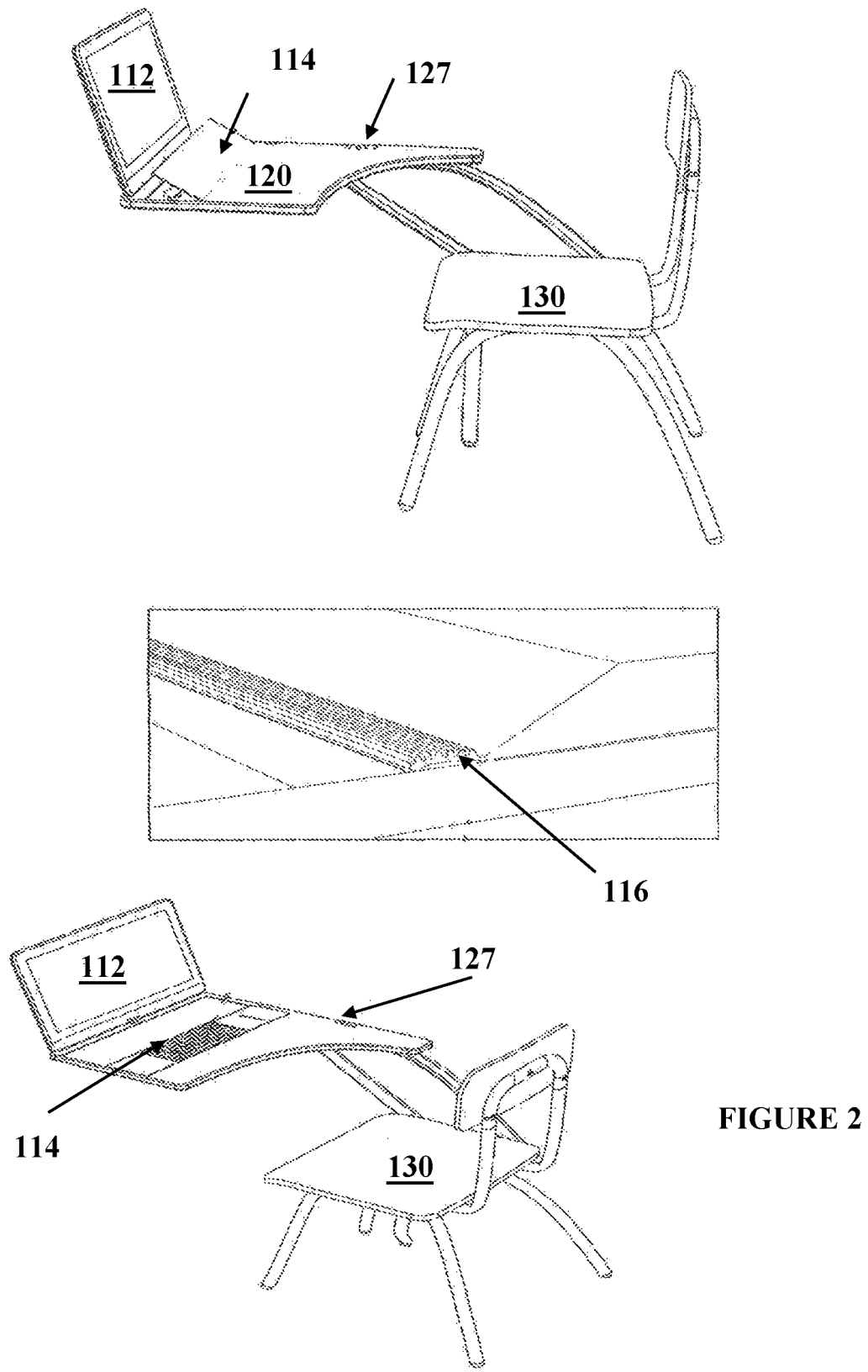
FIG. 2 illustrates the student desk of FIG. 1 with the computer in an open position.

FIG. 2 illustrates the student desk 100 with the computer 110 in an open position. The computer 110 can be a tablet computer having a touchscreen display 112. In an optional embodiment of the invention, the computer 110 comprises a keyboard 114. As shown in the left figure, the bottom/underneath of the keyboard 114 faces upward when at or near a closed position. The bottom of the keyboard 114 is preferably flush with the table 120 when closed to provide a smooth writing surface. As shown in the right figure, the top of the keyboard 114, i.e., the surface with the keys, faces upward when in the open (expanded) position. An optional bumper or wrist rest 116 can be provided as shown.

Figure 3:
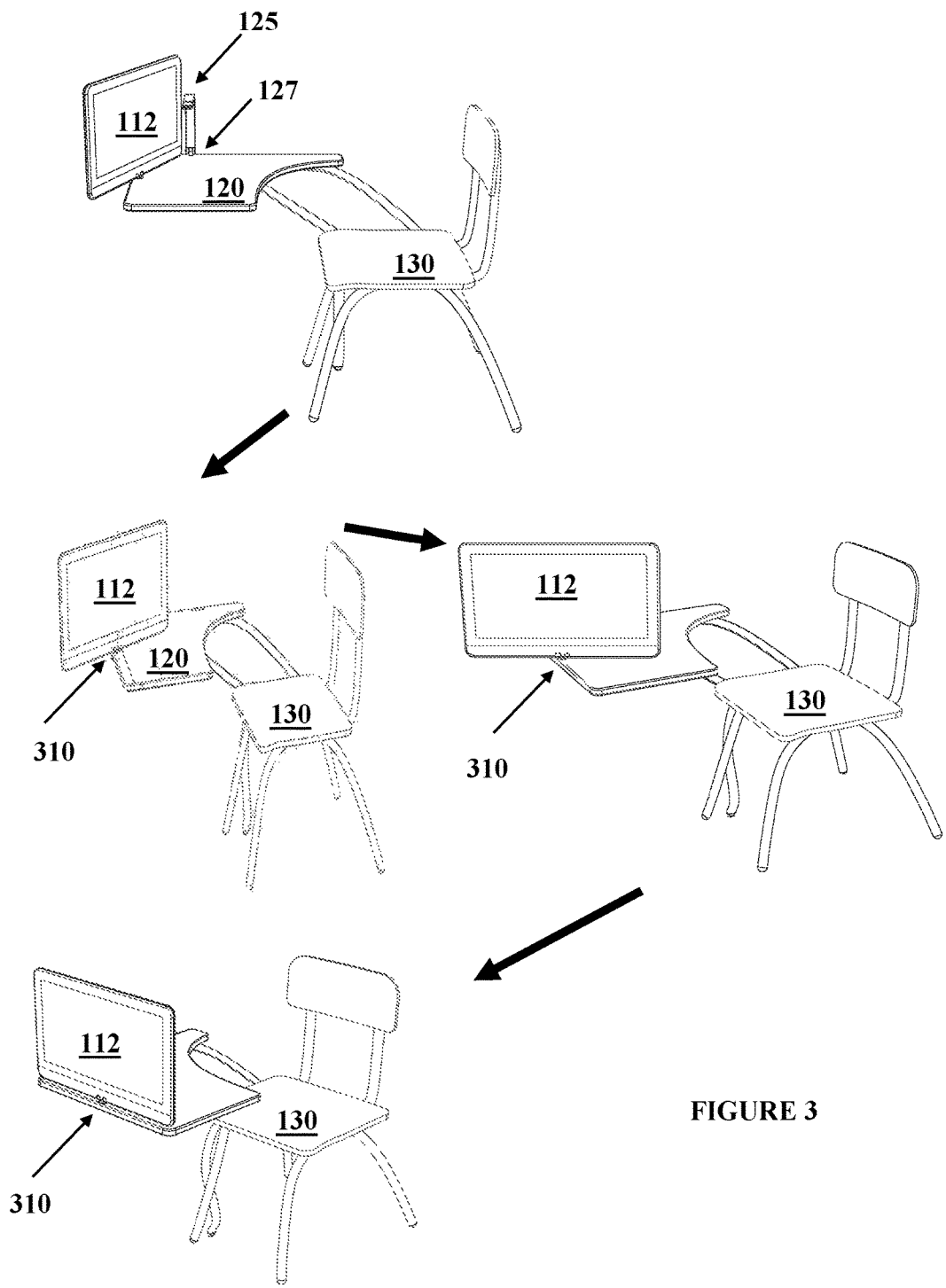
FIG. 3 illustrates rotation of the computer in the student desk of FIG. 1.

FIG. 3 illustrates rotation of the computer 110 about a vertical axis and horizontal axis. A hinge 310 comprising two or more pivots is employed to facilitate rotation about the horizontal and vertical axes.

In an embodiment of the invention, the document camera 125 can rotate about a hinge 127 fastened to a side of the table 120 among a lowered position (under the table 120 as shown in FIG. 1) and the upright position (as shown in FIG. 3), or any position there between. For example, imaging devices with an adjustable arm (with one or two pivot points) such as those disclosed in U.S. Pat. Nos. D715,300 and D677,707 can be modified to attach to the table 120.

Figure 4:
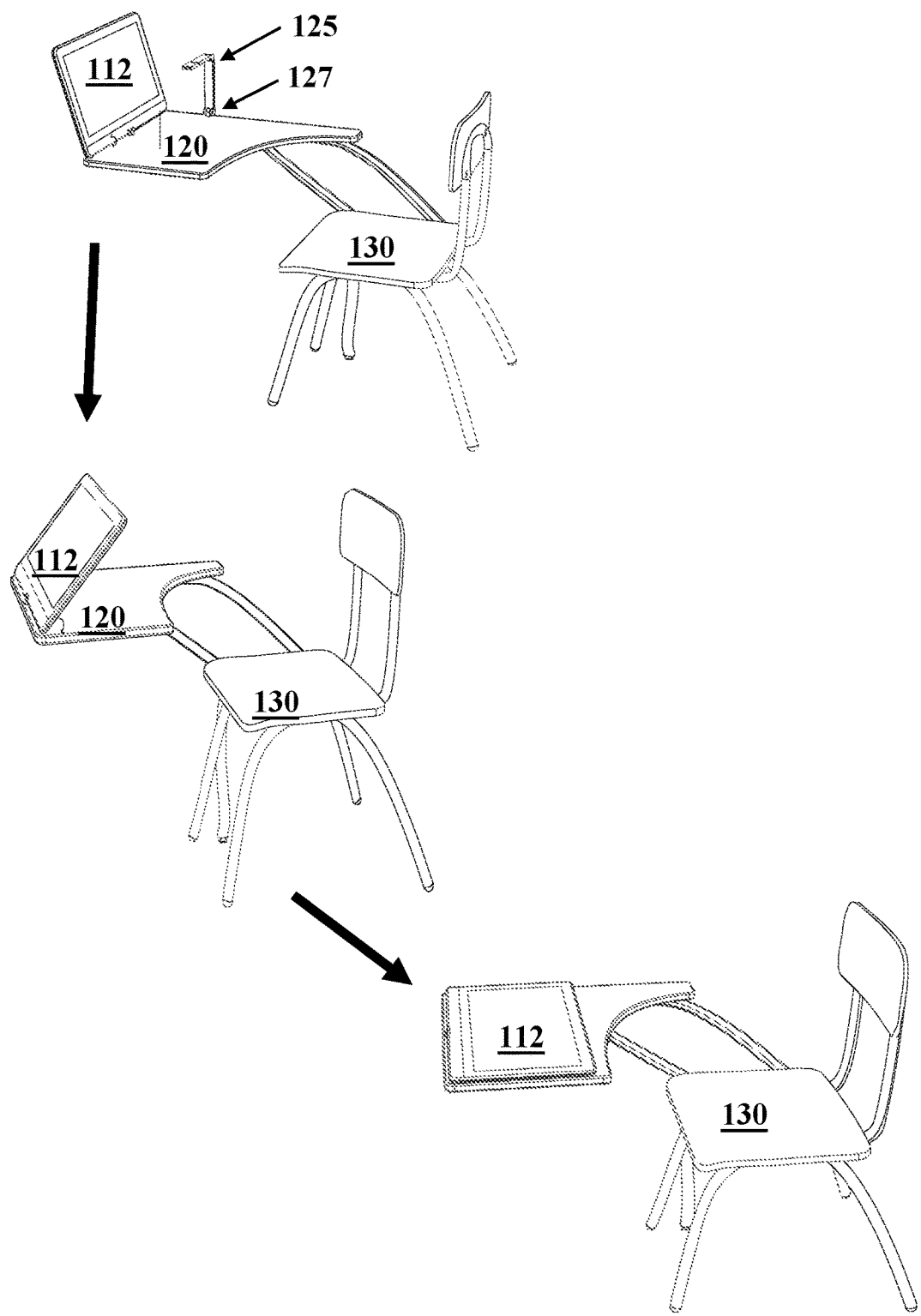
FIG. 4 illustrates the computer touch-screen display in tilted positions.

FIG. 4 illustrates the touchscreen display 112 it tilted positions. As shown at top, the display can be tilted away from the chair 130 in order for the document camera 125 to be rotated in its raised (i.e., open) position. As shown in the bottom figures, the display 112 can be rotated in a position where it faces upward when the computer is in a closed position. Here, a student can use the touchscreen display 112 as a multi-touch surface even when the computer is in the closed position. In an embodiment of the invention, the table 120 may include a recess portion (not shown) so that the display is flush with the surface of the table 120.

Figure 5:
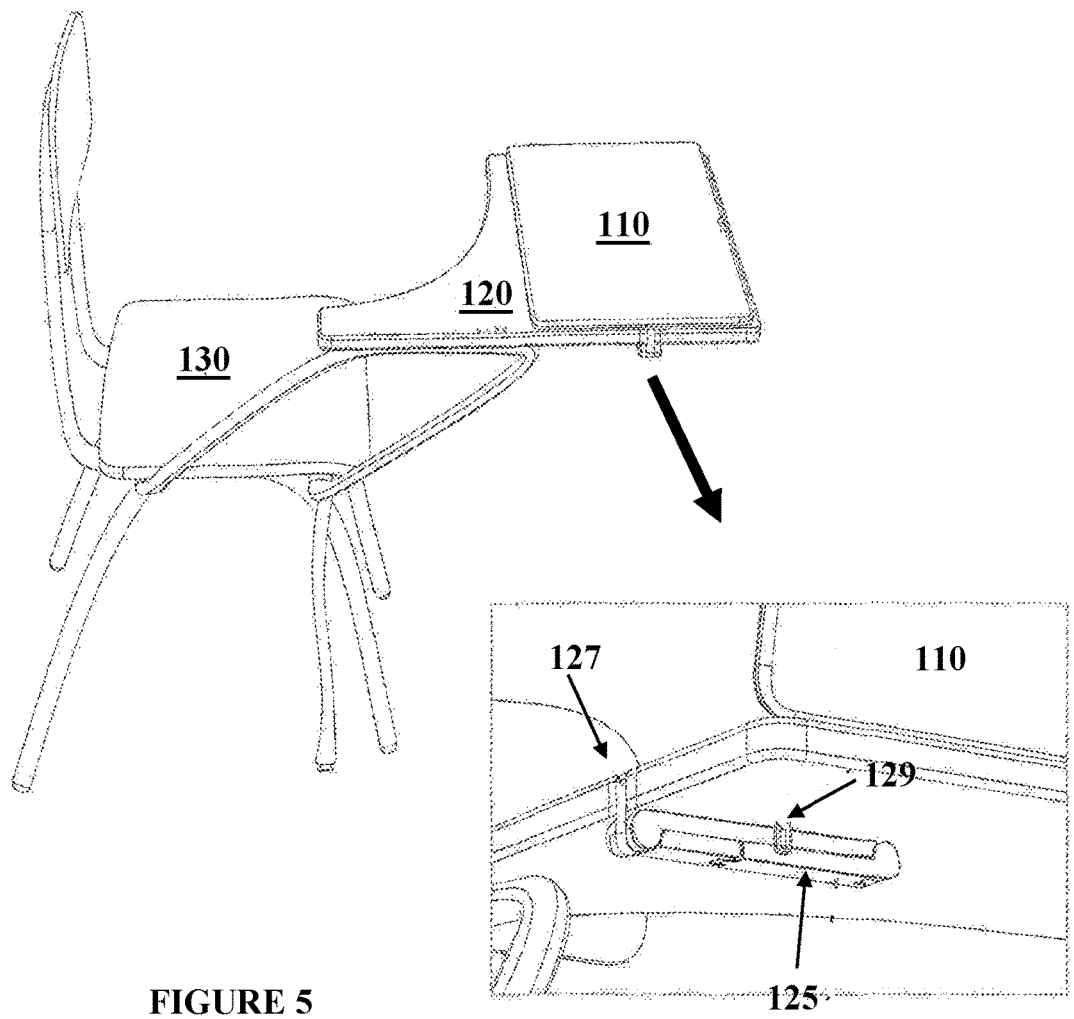
FIG. 5 illustrates a close-up of the document camera in the student desk when in a lowered position.

FIG. 5 illustrates a close-up of the document camera 125 when in its lowered position below the table 120. Here, a clip 129 may be provided to lock the document camera 125 in its lowered position and out of the way of the student.

Figure 6:
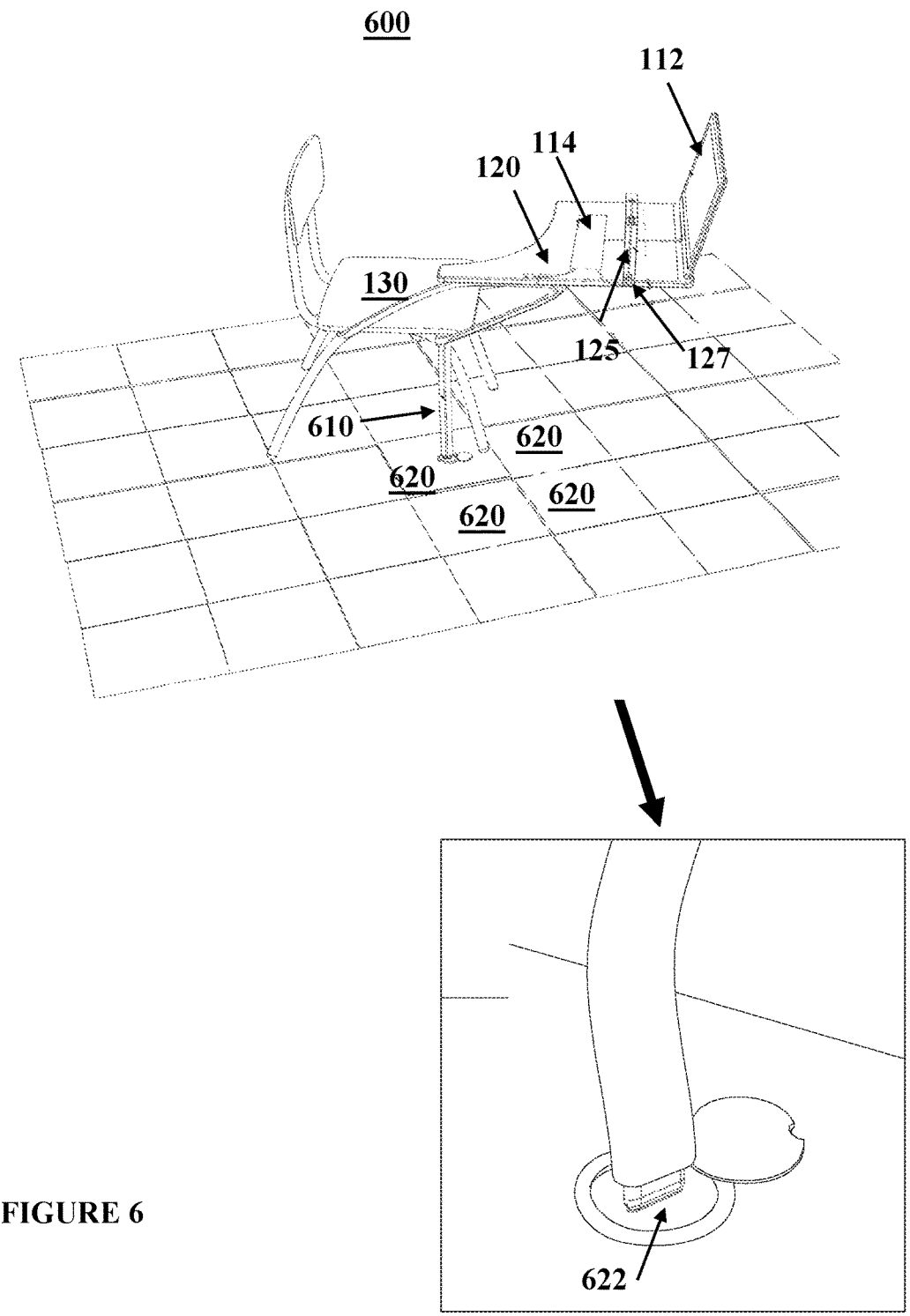
FIG. 6 illustrates a student desk and floor system according to an embodiment of the invention.

FIG. 6 illustrates a student desk and floor system 600 according to an embodiment of the invention. The system comprises the student desk 100, a conduit 610 for wires, and a plurality of floor tiles 620. The conduit 510 houses unsightly wires such as a power cable or communications cable, and can be integrated into the student desk 100 to form a single piece of furniture. The floor tiles 620 comprise spacers (not shown) between the floor and tile to allow for such cables to be hidden for visual purposes and to avoid people and objects from coming in contact with the cables. One or more floor tiles 620 may include an opening 622 for receiving the conduit 610.

In an embodiment of the invention, the computer 110 (along with the document camera 125) communicates with a teacher's computer or other student computers wirelessly, for example, via IEEE 802 protocol, Bluetooth, or ZigBee. The document camera 125 can acquire video via the computer 110 as described in U.S. Pat. No. 8,508,751, the entire disclosure of which is incorporated by reference herein. The computer 110 provides a platform for interactive learning applications (or "apps") to run. These apps may include, but are not limited to: digital text books, a classroom response system, test facilitators, social networking apps, email, homework submission apps, productivity apps, and cloud server apps (for enabling, for example, online storage, bookmarking in text books, etc.).

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:
1. A desk comprising:
a writing surface;
a touchscreen interface of a computer integrated into the writing surface; and
a document camera adjustably and rotatably coupled to the desk;
wherein the document camera is structurally configured to move between a lowered position, an upright position, and a collapsed position; wherein the document camera comprises an adjustable arm with a plurality of pivot points; and wherein the document camera rotates about at least one of the plurality of pivot points such that the document camera may face in a direction other than toward the writing surface while remaining functional.

2. The desk of claim 1, wherein the collapsed position is below the writing surface.

3. The desk of claim 2, further comprising a clip structurally configured to hold the document camera in the collapsed position, such that the document camera is stowed out of the way of the user's extremities.

4. The desk of claim 1, wherein the upright position is above the writing surface and a camera of the document camera is downwardly facing the writing surface.

5. The desk of claim 1, wherein the touchscreen interface is detachably coupled to the writing surface, such that the touchscreen remains functional when detached.

6. The desk of claim 5, wherein the computer is a tablet.

7. The desk of claim 6, wherein an edge of the tablet is hingedly and/or rotatably attached to the desk and configured to allow a user to move the tablet between a closed position and an open position, or an intermediate position between the closed position and the open position; wherein the tablet is rotatable, about at least two axes, when in the open position or the intermediate position.

8. The desk of claim 7, wherein the tablet is flush with the writing surface in the closed position, such that the tablet's display is exposed to the user.

9. The desk of claim 1, wherein the document camera comprises a single camera.

10. The desk of claim 1 further comprising a keyboard adjustably integrated into the writing surface.

11. The desk of claim 10, wherein the writing surface further comprises a palm rest.

12. The desk of claim 1 further comprising a seating surface connected to the writing surface, wherein the seating surface is different than the writing surface.

13. The desk of claim 1, wherein the touchscreen interface is hingedly and/or rotatably coupled to the desk, about at least two axes, via a single coupler.

14. The desk of claim 1, wherein the writing surface, the touchscreen display, and the document camera are each configured to be used simultaneously.

15. A desk comprising:

a writing surface;

a touchscreen interface of a computer integrated into the writing surface; and a document camera adjustably and rotatably coupled to the desk;

wherein the document camera is structurally configured to move between a lowered position, an upright position, and a collapsed position; wherein the touchscreen interface is detachably coupled to the writing surface, such that the touchscreen remains functional when detached; wherein the computer is a tablet; and wherein an edge of the tablet is hingedly and/or rotatably attached to the desk and configured to allow a user to move the tablet between a closed position and an open position, or an intermediate position between the closed position and the open position; wherein the tablet is rotatable, about at least two axes, when in the open position or the intermediate position.

16. The desk of claim 15, wherein the tablet is flush with the writing surface in the closed position, such that the tablet's display is exposed to the user.

* * * * *